Patented June 1, 1926.

1,586,850

UNITED STATES PATENT OFFICE.

FRANKLIN S. SMITH, OF PHILADELPHIA, PENNSYLVANIA, ASSIGNOR TO THE PRODUCTS PROTECTION CORPORATION, OF NEW YORK, N. Y., A CORPORATION OF DELAWARE.

METHOD OF MOLDING PHENOLIC CONDENSATION PRODUCTS.

No Drawing.   Application filed September 15, 1920.   Serial No. 410,456.

This invention relates to the molding of articles from phenolic condensation products. For convenience of description the term "condensation product" will be used in this specification and in the claims in a generic sense to include all those phenolic condensation products having characteristics, which, in molding, give rise to the difficulties hereinafter discussed.

In making molded articles of condensation product, it is common to start with a molding mixture in the form of a powder, which consists of a filler or carrying material, such as "wood flour" impregnated with the condensation product. This molding mixture will hereinafter be referred to as product "A".

When product "A" is heated to about 80° C., it begins to change into a plastic form commonly known as product "B". This change is hastened by increasing the temperature to a point slightly above 130° C. Beyond this point the time temperature curve flattens, and increased temperature has little, if any, effect in accelerating the action. Continued heating at temperatures over 80° C. causes product "B" to change to product "C", and if the molding mixture is maintained under a pressure of from 1,000 to 5,000 pounds per square inch, the resulting product is a solid mass commercially known as molded condensation products.

In accordance with the practice now commonly employed for making product "C" in molded form, commercially known as molded condensation products, the molding mixture or product "A", without any preparatory treatment, is rammed or packed into steel molds at about room temperature or slightly above, say about 25° C. above room temperature, and is subjected in the molds to the required pressure, the temperature of the molds being gradually increased to a point somewhat above 130° C. After the proper time has elapsed, the heated molds are cooled to their original low temperature.

This process gives satisfactory results for small pieces, such as pieces which have a wall thickness less than one-half of an inch, and in cases where maximum density, tensile strength and dielectric strength are not essential. If an article of greater thickness is molded in the usual way, as above described, numerous defects appear. Difficulty is experienced in producing a molding free from cracks, and even then it is found that the condensation products nearest the outside of the piece is denser and less porous than that in the core or center and has greater dielectric and tensile strength. If, as is sometimes done, the piece is removed from the mold while hot, swellings or blisters form on the surface within a short time, usually several minutes after the piece leaves the mold. If a piece is sawed or broken across, a distinct cavity is found and the material in the region of the cavity is soft and porous. If the article is quickly cooled, the molding is of unreliable strength due to internal stresses set up by the quick cooling.

It is believed that these defects are due to the following considerations: The molding mixture receives heat only by conduction from the heated molds. Obviously the changes of state from stage "A" through stage "B" to stage "C" take place progressively from the outside to the center of the piece, which is in the direction of the flow of the heat flux. The molding mixture contains moisture and air, and ammonia gas is evolved during the molding operation. It is apparent that the presence of air, the moisture either in the form of water or steam, and the ammonia, decreases the density of the final product if those substances are not permitted to escape. It is found in practice that in a large piece they do not escape, but remain entrapped in the center, or in the body of the molding, causing the above mentioned region of porous and weak material of low density. No doubt, the progressive changes of state from the outside to the inside of the molding tend to prevent the gases from escaping, because after the outer shell portion of the material has been converted to the stage "C" under pressure, such portion is no longer porous and consequently prevents the escape of gases. The formation of blisters can be traced to these entrapped gases which break through the surface when the pressure is removed. At the working temperature and pressure commonly employed in the molding process, the water, and sometimes the ammonia, are in liquid form. When the molding pressure is released, these liquids vaporize and expand. If the walls are still soft enough to yield, as they are when the molded piece is removed hot from the mold, a blister is formed. Moreover, the flow of heat flux has been interrupted or retarded by the very low heat conductivity of the entrapped gases and in consequence a complete change of state is not realized. This results in weak or imperfectly cured material in the region of the entrapped gases.

The above defects are aggravated by the character of the thermal conductivity of the molding powder. Thermally it resembles a conductor of the second class, such as glass, being a very poor heat conductor when cold but a materially better heat conductor as the temperature rises. Thus, to raise the temperature of a given mass of the molding powder from 20° C. to 30° C. requires much more time than to raise the temperature of the same mass from 70° C. to 80° C.

Thus, it has been found that, except in the case of very small objects, so small that the mass of product "A" employed in their manufacture may all be raised to the transition temperature practically at the same time, articles manufactured by the present practice are almost invariably formed with a weak, porous central zone which materially reduces both their tensile and dielectric strengths and tends to make them more or less pervious to gas. Moreover, the strains set up within such pieces, occasioned by the slow rate at which the transition proceeds and the sudden chilling of the external part while the inner mass is still hot, yet further reduce their strength. At the same time, the present method is inefficient in the expenditure of time and energy in heating, chilling and reheating the various parts of the molding apparatus.

It is the object of the present invention to do away with these objectionable features in the molding of material of the character described, and to produce molded articles of homogeneous structure and of great uniformity having no central zone of weak and porous material and hence possessing higher tensile and dielectric strength and being more impervious to gases. Moreover, this method will effect a material reduction in the time required to mold a given article.

To this end the product "A", before being put in the molds, is thoroughly preheated to a temperature just below the transition temperature. Moreover, the material is, prior to the molding, thoroughly dried chemically.

Specifically, in carrying out the process according to the invention, the product "A" is stored in a cabinet containing a chemical drying agent, such as calcium chloride, and is allowed to remain there for such time as may be necessary to remove the moisture from the mixture. The chemically dried powder is then allowed to stand in a thermostatically controlled electric oven at a temperature slightly under 80° C. for a sufficient length of time to heat the mass of material throughout. This heating decreases by expansion the quantity of air or other gases which may be present in the mixture. Due to the low heat conductivity of the mixture and low temperatures, this is the slowest part of the heating. In practice a sufficient number of charges or quantity of material is weighed out to make up a day's output and is placed in the oven in the afternoon or evening of the preceding day and allowed to remain there during the night, the temperature within the chamber being maintained slightly under 80° C. as stated. The material, having thus been gradually preheated throughout is then ready to be placed in the molds for molding, and is kept in the oven at the temperature stated until it is placed in the molds.

At the beginning of the molding operation, the mold is heated to about 100° C. The preheated charge is rammed into the mold, and the mold is placed between the heated platens of a press where the pressure is applied and the temperature is increased, preferably slightly above 130° C. Change of state occurs quickly, as is evidenced by the fact that a given mold can be closed in about one-quarter to one-tenth of the time it takes to close a mold on a cold charge, that is a charge at about room temperature. The pressure and heat are continued for a time determined by experience and dependent upon the average wall thickness of the product or article being molded. At the termination of this time the hot mold is opened, the molded piece removed while still hot, and allowed to cool slowly in an insulated receptacle resembling, in principle, a fireless cooker.

Due to the uniform preheating throughout, and the consequent relatively more uniform transition of the material throughout the mass from the "A" stage into the plastic "B" stage, and because of the relatively quick closing of the mold under pressure, maximum pressure of trapped gases is reached at a comparatively early point in the change of state and the gas has a better opportunity to escape, since there is no shell of impervious material so completely changed as to seal the gases within the body of the molding. As a result of this no trouble from blisters or swelling arises when the molded piece is removed from the mold while still hot.

The final slow cooling in an insulated chamber, while perhaps not essential, has an annealing effect tending to release the internal stresses in a manner analogous to the annealing of steel.

It has thus been found in practice that whereas the use of a cold, incompletely dried mixture in accordance with the usual practice results in the above described defects, the simple expedient of thoroughly drying and uniformly preheating the mixture eliminates these defects to a great extnt and at the same time results in a substantial economy in time, labor and apparatus. The cost of manufacture is substantially reduced and a product results which is free from the indicated defects and which is of particular value when large molded articles are to be made or in cases where maximum density and high tensile and dielectric strength are of advantage, as in electric insulators and certain parts of condensers, transformers, etc.

I claim:

1. The method of making a molded article of a condensation product which consists in uniformly preheating a powdered mass of product "A" to just below its transition temperature, introducing it into a mold, and subjecting it to pressure and increased temperature to transform the product "A" into molded condensation product.

2. The method of making a molded article of a condensation product which consists in uniformly preheating a mass of product "A" to just below its transition temperature, introducing it into a mold, subjecting it to pressure and increased temperature to transform the product "A" into molded condensation product, and slowly cooling the molded product.

3. The method of making a molded article of a condensation product which consists in uniformly preheating a powdered mass of product "A" to just below its transition temperature, introducing it into a mold, subjecting it to pressure and increased temperature to transform the product "A" into molded condensation product, and removing the product from the mold while still hot and slowly cooling it.

4. The method of making a molded article of a condensation product which consists in thoroughly drying a mass of product "A," uniformly heating it to a temperature just below its transition temperature and then molding it under pressure with increased temperature to transform it into molded condensation product.

5. The method of making a molded article of a condensation product which consists in subjecting a powdered mass of product "A" to prolonged heating at a temperature just below its transition temperature and then molding it.

6. The method of making a molded article of a condensation product which consists in preliminarily drying a powdered mass of product "A" subjecting it to prolonged heating at a temperature slightly under 80° C., placing the mass in a mold previously heated to a temperature above 80° C., and thereafter applying pressure and maintaining the temperature above 80° C., until the mass is transformed into molded condensation product.

7. The method of forming a molded article of a condensation product which consists in subjecting a mass of product "A" to the action of a chemical drying agent, thereafter placing the mass in a heated receptacle and maintaining it for an extended period of time at a temperature slightly under 80° C., placing the heated mass of product "A" in a mold which is at a temperature of approximately 100° C., and thereafter subjecting the mass to pressure while maintaining the mold at or above 100° C. until the mass is transformed into molded condensation product.

8. The method of making a molded article of a condensation product which consists in removing the moisture from a powdered mass of product "A", subjecting the mass to heat at a temperature slightly below its transition temperature for a period of time sufficient to heat the entire mass uniformly throughout, placing a charge of the said heated mass in a mold having a temperature in excess of 80° C., subjecting the charge in the mold to pressure and increasing the temperature of the charge to and maintaining it at a point above 80° C. until the mass is transformed into molded condensation product.

9. The method of making a molded article of a condensation product which consists in removing the moisture from a mass of product "A", subjecting the mass to heat at a temperature slightly below its transition temperature for a period of time sufficient to heat the entire mass uniformly throughout, placing a charge of the said heated mass in a mold having a temperature in excess of 80° C., subjecting the charge in the mold to pressure, increasing the temperature of the charge to and maintaining it at a point above 80° C. until the mass is transformed into molded condensation product and thereafter releasing said pressure and removing the hot molded product from the said mold and gradually cooling it in an annealing oven.

10. The improvement in the method of making a molded condensation product article from product "A" which consists in bringing product "A" to a uniform temperature slightly below its transition temperature before introducing it into the mold.

11. The improvement in the method of making a molded condensation product article from product "A" which consists in maintaining a powdered mass of product "A" in the presence of a chemical drying agent to remove moisture therefrom prior to introducing it into the mold.

In testimony whereof I affix my signature.

FRANKLIN S. SMITH.